United States Patent [19]

Shaver

[11] 4,195,520
[45] Apr. 1, 1980

[54] PORTABLE FLOW-MEASURING DEVICE

[76] Inventor: Michael R. Shaver, 4742 Bluffwood North Dr., Indianapolis, Ind. 46208

[21] Appl. No.: 950,259

[22] Filed: Oct. 10, 1978

[51] Int. Cl.$^2$ .............................................. G01F 1/20
[52] U.S. Cl. .................... 73/215; 73/40.5 R
[58] Field of Search ............ 73/215, 216, 40.5 R, 73/40.5 A

[56] References Cited

U.S. PATENT DOCUMENTS

| | | | |
|---|---|---|---|
| 2,283,906 | 5/1942 | Bennett | 73/215 |
| 3,301,050 | 1/1967 | McNulty | 73/215 |
| 3,412,612 | 11/1968 | Carr | 73/215 |
| 3,427,878 | 2/1969 | Gerlitz et al. | 73/215 |
| 3,781,624 | 12/1973 | Tullis | 318/482 |
| 3,866,028 | 2/1975 | Schontzler | 73/215 |
| 3,934,472 | 1/1976 | Bradham | 73/215 |
| 4,022,059 | 5/1977 | Schontzler et al. | 73/215 |
| 4,098,117 | 7/1978 | Baumoel | 73/216 |
| 4,127,032 | 11/1978 | Martig, Jr. | 73/215 |

*Primary Examiner*—Donald O. Woodiel
*Attorney, Agent, or Firm*—Woodard, Weikart, Emhardt & Naughton

[57] ABSTRACT

A portable flow-measuring device for determining the volumetric flow rate of a flow stream includes a generally cylindrical flow conduit insertable into a sewer pipe and a reservoir member disposed atop the flow conduit and being in flow communication therewith. An inflatable tubular collar is disposed completely around the flow conduit such that when inflated it seals the area between the sewer pipe and the flow conduit such that all flow is funneled into the flow conduit. The reservoir member is closed at one end and includes a weir plate sealingly attached over the opposite and otherwise opened end. As flow enters through flow conduit, reservoir member will fill until the crest of the opening of the weir plate is reached and then this flow will exit from the reservoir member through the opening in the weir plate. The height of fluid flowing through the opening of the weir plate, once the draw down is compensated for, determines the volumetric flow rate of the flow stream in the sewer pipe due to the fact that the weir plate is specifically designed and dimensioned for use with standard flow tables. A rear end plate member is provided with graduations for directly indicating the vertical height of the water level in the reservoir member. The uppermost surface of the reservoir member includes a metering port for installation and use of flow measurement and recording equipment so that flow measurement readings can be taken and recorded automatically.

12 Claims, 3 Drawing Figures

PORTABLE FLOW-MEASURING DEVICE

BACKGROUND OF THE INVENTION

This invention relates in general to flow-measuring devices and in particular to weir arrangements for use in sanitary sewer systems.

The flow content within a sanitary sewer system consists of primarily three component parts. These parts include ground water which seeps into the sewer system, rain water from surface run-off and sewage. Although ground water and rain water are initially essentially clean and would require only a minimal amount of treatment, once these waters are mixed with sewage, this water must be treated in the same manner and to the same degree as the sewage. Consequently, municipalities devote significant amounts of money each year to treating water which was once virtually potable.

Presently sewer system evaluations are required by the Environmental Protection Agency for municipalities not meeting Federal Pollution Abatement standards. One parameter of such an evaluation is the amount of flow in various segments of the sewer system in order to test the performance of that segment. In this regard, several sewage meters and flow-measuring apparata designs have been conceived and the following listed patents provide some indication of these.

| U.S. Pat. No. | Patentee | Issue Date |
|---|---|---|
| 2,283,906 | Bennett | 5/26/42 |
| 3,301,050 | McNulty | 1/31/67 |
| 3,427,878 | Gerlitz, Jr. et al. | 2/18/69 |
| 3,781,624 | Tullis | 12/25/73 |
| 3,866,028 | Schontzler et al. | 2/11/75 |
| 3,934,472 | Bradham | 1/27/76 |
| 4,022,059 | Schontzler et al. | 5/10/77 |

Bennett discloses a sewage meter wherein a flow pipe is arranged within a sewer flow line and an inflatable tubular ring closes the area between the flow line and flow pipe such that all flow passes into the pipe. The pressure head of the flow through the flow pipe is measured against the flow pipe cross-sectional area in order to determine the volumetric flow rate.

McNulty discloses a liquid flow-measuring apparatus which includes a V-notched weir plate arranged with a wedge-shaped clamping member to fit the apparatus into differently sized conduits.

Gerlitz, Jr. et al. discloses a portable liquid measuring flume having an external profile adapted to fit the inside contour of the bottom and sides of an upwardly open conduit, such as the floor of a manhole, and including measuring equipment adapted to be mounted on and transported with the flume.

Tullis discloses a portable liquid level indicating and flow-measuring device for mounting above a conduit or trench adapted to contain a moving liquid, such as water, sewage and the like, and to rapidly and effectively measure and record the depth of flow. A weighted electrically conductive probe is automatically reeled out upon a cable from a measuring and recording device, so as to locate the upper level of electrically conductive liquid flowing beneath the device, and upon command, such probe also locates the invert of the conduit or bottom level of the liquid.

Schontzler et al. U.S. Pat. No. (3,866,028) discloses a fluid flow level detector which contacts a fluid surface in an open channel providing a fluid surface height signal related to a predetermined reference height level. The fluid surface signal is directed to a computer where it is converted into a signal related to flow volume by a function read-only memory.

Bradham discloses a unitary molded venturi flume unit for use in measuring liquid flow through a conduit and having a closed-end well section at one end of the flume throat and a connecting nipple section defining an access passage which extends from the lower portion of the well for sealed connection with a conduit. The walls of the throat and well sections extend substantially above the access passage and cause all liquid flowing through the conduit to flow through the throat.

Schontzler et al. U.S. Pat. No. (4,022,059) discloses a sampling system for drawing samples from a liquid flow which is responsive to manual actuation, predetermined increments of flow volume, or predetermined increments of time. The system includes a flow meter and a flow sampler interconnected and physically located in the vicinity of the flow being monitored. The flow meter converts the flow head to flow rate and subsequently to flow volume. The head-to-flow conversion is mechanical and provides for flow measurements through a flow channel having a given cross-section shape over a wide range of shape sizes by means of an electrical adjustment.

One approach to flow measurement which is presently being followed is to construct the weir on site and custom fit each installation to the particular manhole and sewer segment as well as anticipated flow requirements. This construction involves such materials as bricks, steel and plywood as well as a number of tools and special equipment. Consequently, the cost in terms of labor and material is significant. Once the flow measuring is completed, this weir construction is demolished necessitating yet further labor hours. The complete build, use and demolish cycle of such weir construction often exceeds a total cost of $2,000. Furthermore, if the installer should err in selecting the particular weir shape for a site, the installation might be inaccurate in its measurement.

It would be a significant improvement to such weir construction to design a portable weir plate apparatus which could be quickly installed in a variety of different sites as well as easily removed therefrom. A further improvement would be to design such an apparatus so that it would be reusable and so that the weir plate could be interchanged. A further improvement would be to provide such apparatus with an area to hold a suitable pool volume of fluid so that conventional flow-measuring equipment could be used in conjunction therewith. The design of the subject invention which is disclosed and described herein accomplishes each of these improvements as will be apparent.

SUMMARY OF THE INVENTION

A portable flow-measuring device for determining the volumetric flow rate of a flow stream in a pipe comprises a flow conduit being open at one end and sealed closed at the opposite end, means for funneling all of the flow within the pipe into the flow conduit, a reservoir member having an open end and a closed end and being in flow communication with the flow conduit and a removable weir plate sealingly attached over the open end of the drum member.

One object of the present invention is to provide an improved flow-measuring device.

Related objects and advantages of the present invention will be apparent from the following description.

BRIEF DESCRIPTION OF THE DRAWINGS

FIG. 3 is a front elevation view of an end plate member comprising a portion of the FIG. 1 device.

DESCRIPTION OF THE PREFERRED EMBODIMENT

Figure 1:
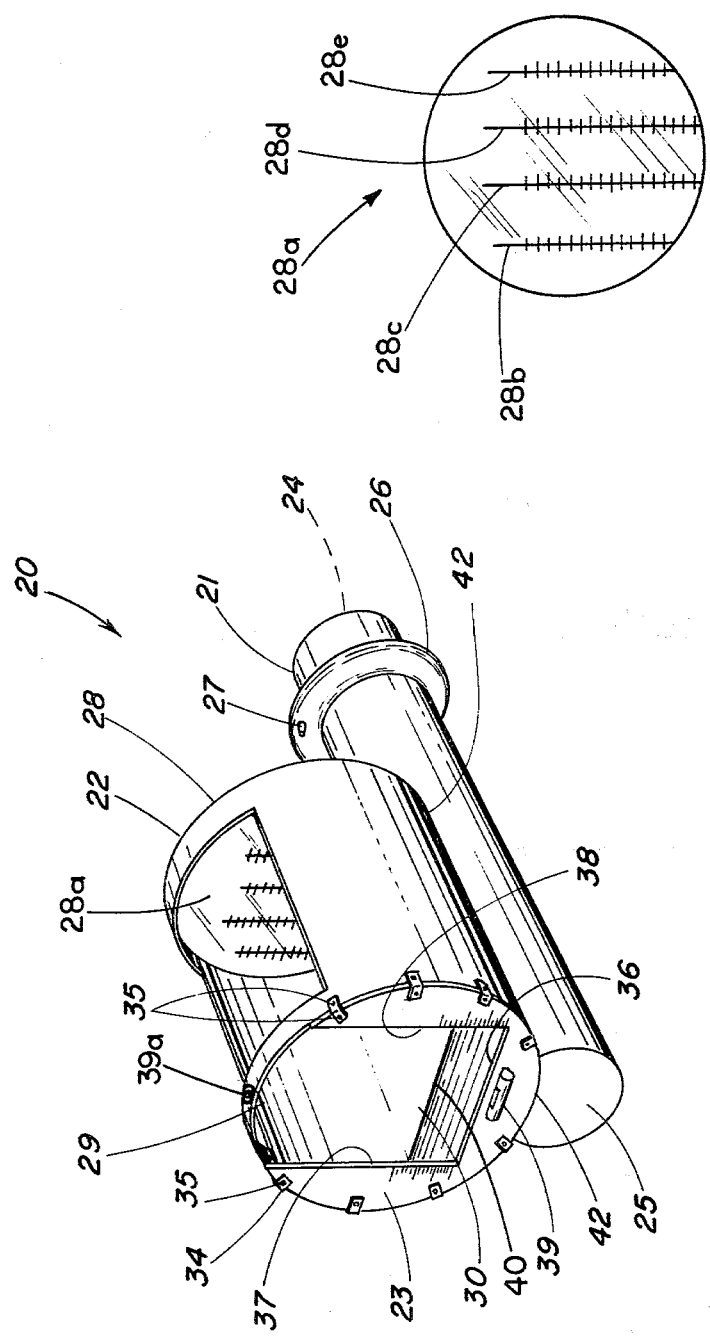
FIG. 1 is a perspective view of a portable flow-measuring device according to a typical embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1, there is illustrated a portable flow-measuring device 20 which includes flow conduit 21, reservoir drum member 22 and weir plate 23. Flow conduit 21 is a generally cylindrical section of tubing, and may be a section of pipe, which is opened at its first end 24 and is closed at its second and opposite end 25. Disposed completely around flow conduit 21 adjacent first end 24 is an inflatable tubular collar 26 which is expandable in outside diameter by the introduction of a gas, such as air, into nipple 27. Reservoir drum member 22 is preferably of a metal construction and is disposed atop flow conduit 21 and is rigidly secured thereto by welding, brazing or similar suitable metal-to-metal joining techniques. An alternate material choice for the component parts of device 20 is one of the thermoforming or thermosetting plastics which would be durable enough for this application and rigid enough to yield accurate readings. It is also envisioned that member 22 could take on shapes other than the cylindrical drum shape illustrated and member 22 could be molded as a single integral part with flow conduit 21. Drum member 22 is closed on first end 28 by means of an end plate member 28a, and although opposite end 29 is open, weir plate 23 is sealingly attached over the entire area of open end 29 such that any fluid exiting from drum member 22 will do so only through weir plate opening 30. Although a variety of fastening means are possible for attaching weir plate 23 against open end 29, the preferred method is to provide a series of brackets 34 which are attached to weir plate 23 by a first series of threaded fasteners 35 and which fit the diameter of drum member 22 to which they are further secured by another series of threaded fasteners 35. Brackets 34 may be secured to the outside of member 22 as is illustrated or alternatively to the inside of member 22 in virtually the same manner.

The United States Department of the Interior, Bureau of Reclamation has published a manual entitled "Water Measurement Manual", the second edition of which was published in 1967. This manual defines a "weir" as:

"an overflow structure built across an open channel, usually to measure the rate of flow of water. Weirs are acceptable measuring devices because, for a weir of a specific size and shape with free-flow, steady-state conditions and proper weir-to-pool relationships, only one depth of water can exist in the upstream pool for a given discharge. The discharge rates are determined by measuring the vertical distance from the crest of the overflow portion of the weir to the water surface in the pool upstream from the crest, and referring to computations or tables which apply to the size and shape of the weir. For standard tables to apply, the weir must have a regular shape, definite dimensions, and be set in a bulkhead and pool of adequate size so the system performs in a standard manner."

The combination of flow conduit 21, drum member 22 and weir plate 23 provides such a weir as this manual defines which is portable, reusable and incorporates means for interchanging one weir plate design with another. Lower edge 36 of weir plate opening 30 provides the crest of the overflow portion of the weir and sides 37 and 38 are graduated with vertical markings so that standard tables can be utilized to ascertain the flow rate. The crest of the fluid exiting from drum member 22 is diagrammatically indicated by fluid line 40. As water flows out through opening 30, the water level within member 22 is drawn down such that before the tables can be utilized, the draw down of the water level must be compensated for.

The interior of drum member 22 provides a suitable upstream pool for the requisite weir-to-pool relationship. Weir plate 23 also includes a bubble level 39 to insure that weir plate 23 is oriented properly in order to obtain a true vertical height of the water above bottom edge 36 (crest). Additionally, a fish-eye level 39a is located at the top of member 22 as is illustrated. Although the graduations on sides 37 and 38 could be used in combination with the standard tables to determine the flow rate, a more suitable arrangement is to utilize the weir apparatus disclosed herein with a flow-measurement and recording device or to measure the vertical height of the water level in member 22 at a location which is not affected by crest draw down. These flow-measurement and recording devices are typically referred to as meters and are generally either mechanical or electronic in operation. One very common type incorporates a pair of electrically conductive metal probes, one of which senses a first or lower level such as the bottom level of the water and the other probe is movable vertically to locate and senses the top surface of the water. Consequently, when the circuit is completed, the top probe movement ceases and a reading as well as recording can be taken of the vertical height of the water. In order to utilize such measuring and recording equipment, a quiescent zone for the flow to pool, such as that provided by the interior of drum member 22, is necessary. The uppermost surface of drum member 22 has a metering port 41 located therein which is suitable for the locating of such flow measurement and recording devices. The versatility of device 20 wherein it is usable with virtually any type of flow measurement and recording equipment is an important feature in that device 20 can be utilized by any municipality, regardless of the measurement equipment which they already possess. Consequently, device 20 is available for use without necessitating any further capital expenditures. In those situations where direct reading of a vertical height is desired such that the tables can be used without having to compute a draw-down compensation, end plate member 28a (see FIG. 3) is provided with various series of graduation markings 28b, 28c, 28d and 28e. Each series represents a different weir plate style and the number of such series can be increased or decreased, depending on the versatility desired. End plate member 28a is sufficiently removed from opening 30 so as not to have the vertical height read against the series of graduation markings affected by draw down. The graduations on sides 37 and 38 may be spaced so as to include the compensation for draw down and thereby indicate a gallons-per-hour flow rate. Similarly, the series of graduation markings 28b-28e may be arranged so as to indicate inches of vertical depth as well as an hourly flow rate in gallons. If only the height of the water in drum member 22 is desired, then only a single series of graduation markings is necessary. If a gallons-per-hour flow rate is to be read directly, then a different series of graduations is necessary for different weir plate styles.

Flow conduit 21 is provided with a flow outlet 42 which is located in the uppermost surface of conduit 21 adjacent opposite closed end 25. Flow outlet 42 is created by removing a generally rectangular and curved section of the generally cylindrical wall of flow conduit 21 and it is this flow outlet area into which drum member 22 is placed and rigidly secured. The lowermost surface of drum member 22, which is actually located within the inside diameter area of conduit 21, includes a flow inlet 43 which is positioned somewhat symmetrically with respect to flow outlet 42 for establishing flow communication between conduit 21 and drum member 22.

Figure 2:
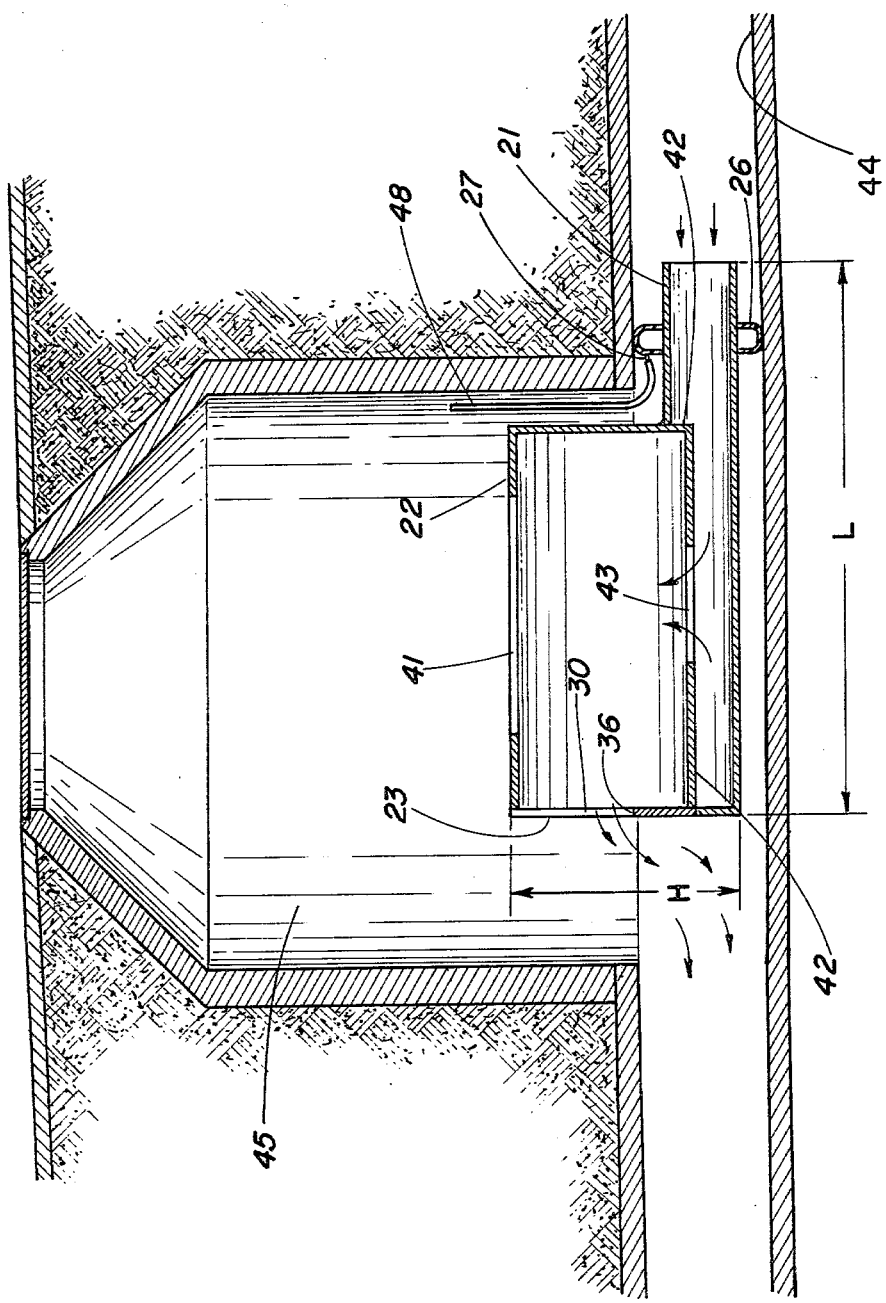
FIG. 2 is a full section view of the FIG. 1 device as located in a manhole and sewer pipe.

Referring to FIG. 2, the relative locations of flow outlet 42 and flow inlet 43 can be seen in better detail. Furthermore, FIG. 2 illustrates the positioning of portable flow-measuring device 20 as installed within a sewer pipe 44 and manhole 45. As illustrated, flow conduit 21 has been inserted into sewer pipe 44 and inflatable tubular collar 26 has been inflated by means of air introduced through tube 48. Drum member 22 and weir plate 23 are located in the mahole 45 and metering port 41 opens upwardly toward the street level. Inflatable tubular collar 26 seals closed the area between the outside diameter of flow conduit 21 and the inside diameter of sewer pipe 44 such that the flow stream passing through sewer pipe 44 toward manhole 45 will be forced into flow conduit 21 in a funneling type of manner. The flow which enters flow conduit 21 will initially fill flow conduit 21 and then rise through flow outlet 42 into flow inlet 43 and then fill a portion of the interior of drum member 22 before this flow cascades over bottom edge 36. Very quickly after insertion of device 20 into the particular sewer pipe and manhole, a free-flow, stead-state condition will be achieved. Once the fluid height within drum member 22 reaches the level of bottom edge 36 of weir plate 23, this fluid will begin to flow over bottom edge 36 back into the sewer flow stream. Do to the specific sized and dimensioned opening 30 of weir plate 23, the vertical height of the water above bottom edge 36 provides an exact indication of the volumetric flow rate of the flow stream within the sewer pipe. Arrows have been provided in FIG. 2 in order to illustrate the direction of flow of the incoming flow stream.

Due to the fact that manhole sizes and sewer pipe sizes are somewhat limited, and due to the desirability that portable flow-measuring device 20 be usable in virtually in any sewer arrangement, the dimensional values of device 20 are of particular importance. First of all, the outside diameter of flow conduit 21 must be less than 0.9 times the inside diameter of the sewer pipe 44. This is important due to the fact that even in a somewhat collapsed state, inflatable tubular collar 26 does have some dimension and clearance space for this collar must be provided. A further consideration is that the overall length, designated by L, must be short enough to fit within the diameter, at the bottom, of a standard manhole. Since such manholes are typically four feet in diameter, an overall length of less than four feet is required. This enables device 20 to be inserted lengthwise down through the manhole 45 and then turned so as to insert flow conduit 21 into sewer pipe 44. Similarly, since device 20 is inserted lengthwise down through the manhole, the maximum dimension from the bottom of flow conduit 21 to the top of drum member 22, as indicated by H, must be less than the diameter of a standard manhole opening (at street level) which is 20 inches. A further consideration is that the cross-sectional flow area which is provided by means of flow conduit 21 be no greater than the flow cross-sectional area provided by means of flow outlet 42 and flow inlet 43. By sizing these flow cross-sectional areas accordingly, all of the incoming flow stream entering flow conduit 21 will flow unrestricted into drum member 22 without developing turbulence which would affect the accuracy of the meter readings since these readings require a quiescent pool. Weir plate 23 as illustrated has a generally rectangular opening 30. However, it is to be understood that various designed weir plates are usable with measuring device 20 and either a V-notched plate or other geometric-formed plates are suitable, the particular plate design being dependent upon the particular volumetric flow rate anticipated; it being well known in the flow-measuring art that V-notched weir plates are more suitable for low volume flow.

Once the necessary flow measurements have been taken, collar 26 is deflated and device 20 is removed from the manhole. Thereafter device 20 is available for use at another site, either as is or with a different weir plate.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A portable flow-measuring device for determining the volumetric flow rate of flow stream in a pipe, said portable flow-measuring device comprising:
    a flow conduit being open at one end and sealed closed at the opposite end;
    means for funneling all of the flow within the pipe into said flow conduit;
    a reservoir member having an open end and a closed end and being in flow communication with said flow conduit; and
    a removable weir plate sealingly attached over the open end of said reservoir member.

2. The portable flow-measuring device of claim 1 wherein said reservoir member is positioned atop said flow conduit, said reservoir member having a flow inlet, said flow conduit having a flow outlet, said flow communication between said reservoir member and said flow conduit being through said flow outlet and said flow inlet.

3. The portable flow-measuring device of claim 2 wherein said reservoir member having a metering port located in the uppermost surface of said reservoir member opposite said flow inlet.

4. The portable flow-measuring device of claim 3 wherein said flow conduit and said reservoir member being designed and arranged such that the flow cross-sectional area between said flow conduit and said reservoir member is at least equal to the lateral cross-sectional area of said flow conduit.

5. The portable flow-measuring device of claim 4 wherein said funneling means includes an inflatable tubular collar disposed completely around said flow conduit, said collar being expandable to completely close off any separation of space between the exterior of said flow conduit and the interior of said flow stream pipe.

6. The portable flow-measuring device of claim 5 wherein said weir plate being attached to said reservoir member by means of threaded fasteners.

7. The portable flow-measuring device of claim 6 wherein said flow conduit being substantially cylindrical and said reservoir member being substantially cylindrical.

8. The portable flow-measuring device of claim 7 wherein the outside diameter of said flow conduit is less than 0.9 times the inside diameter of said flow stream pipe.

9. The portable flow-measuring device of claim 8 wherein the overall height of said measuring device is less than twenty inches and the overall length of said measuring device is less than four feet.

10. The portable flow-measuring device of claim 9 wherein the closed end of said reservoir member is provided with an end plate member having a plurality of different series of vertical height graduations thereon, each one of said series corresponding to a different weir plate design, said graduations directly indicating the flow rate through said pipe.

11. The portable flow-measuring device of claim 1 wherein the closed end of said reservoir member is provided with an end plate member having a series of vertical height graduations thereon, said graduations directly indicating the vertical height of liquid in said reservoir member.

12. The portable flow-measuring device of claim 1 wherein the closed end of said reservoir member is provided with an end plate member having a plurality of different series of vertical height graduations thereon, each one of said series corresponding to a different weir plate design, said graduations directly indicating the flow rate through said pipe.

* * * * *